United States Patent
Patel et al.

(10) Patent No.: US 7,394,140 B2
(45) Date of Patent: *Jul. 1, 2008

(54) MICROMIRROR ARRAY DEVICE WITH ELECTROSTATICALLY DEFLECTABLE MIRROR PLATES

(75) Inventors: Satyadev Patel, Sunnyvale, CA (US); Andrew Huibers, Palo Alto, CA (US); Chris Spindt, Menlo Park, CA (US); Peter H Heureux, Felton, CA (US)

(73) Assignee: Texas Instruments Incorporated, Dallas, TX (US)

( * ) Notice: Subject to any disclaimer, the term of this patent is extended or adjusted under 35 U.S.C. 154(b) by 365 days.

This patent is subject to a terminal disclaimer.

(21) Appl. No.: 11/110,184

(22) Filed: Apr. 19, 2005

(65) Prior Publication Data

US 2005/0196896 A1    Sep. 8, 2005

Related U.S. Application Data

(63) Continuation-in-part of application No. 10/627,155, filed on Jul. 24, 2003, now Pat. No. 7,019,376, and a continuation-in-part of application No. 10/437,776, filed on May 13, 2003, now Pat. No. 7,099,065.

(51) Int. Cl.
 *H01L 31/0232* (2006.01)
 *G02B 26/00* (2006.01)

(52) U.S. Cl. .................. 257/436; 257/443; 359/291; 359/295

(58) Field of Classification Search ............ 257/436
 See application file for complete search history.

(56) References Cited

U.S. PATENT DOCUMENTS

| | | | |
|---|---|---|---|
| 5,835,256 | A |  11/1998 | Huibers |
| 5,999,306 | A |  12/1999 | Atobe et al. |
| 6,046,840 | A |   4/2000 | Huibers |
| 6,406,148 | B1 |  6/2002 | Marshall et al. |
| 6,707,610 | B1 |  3/2004 | Woodard et al. |
| 6,844,959 | B2 |  1/2005 | Huibers et al. |
| 6,906,847 | B2 |  6/2005 | Huibers et al. |
| 6,950,217 | B2 * | 9/2005 | Richards ............... 359/238 |
| 6,958,846 | B2 * | 10/2005 | Huibers et al. ......... 359/291 |
| 6,965,468 | B2 * | 11/2005 | Huibers et al. ......... 359/290 |
| 6,970,281 | B2 * | 11/2005 | Huibers et al. ......... 359/290 |
| 6,980,347 | B2 * | 12/2005 | Patel et al. ............. 359/290 |
| 7,002,726 | B2 * | 2/2006 | Patel et al. ............. 329/290 |

(Continued)

OTHER PUBLICATIONS

U.S. Appl. No. 10/627,155, filed Jul. 24, 2003.

(Continued)

*Primary Examiner*—Stephen W Smoot
(74) *Attorney, Agent, or Firm*—W. James Brady, III; Frederick J. Telecky, Jr.

(57) ABSTRACT

Disclosed herein is a micromirror array device that comprises an array of reflective deflectable mirror plates each being associated with one single addressing electrode to be deflected to an ON state angle. A light transmissive electrode is disposed proximate to the mirror plates for deflecting the mirror plates to a non-zero OFF angle. The mirror plates are arranged in the array with a center-to-centre distance of 10.17 microns or less.

61 Claims, 11 Drawing Sheets

U.S. PATENT DOCUMENTS

| | | | |
|---|---|---|---|
| 7,019,376 B2 * | 3/2006 | Patel et al. | 257/436 |
| 7,019,880 B1 * | 3/2006 | Huibers et al. | 359/238 |
| 7,092,143 B2 * | 8/2006 | Heureux | 359/291 |
| 7,119,944 B2 * | 10/2006 | Patel et al. | 359/291 |
| 2001/0053016 A1 * | 12/2001 | Nelson | 359/291 |
| 2002/0146200 A1 | 10/2002 | Kudrle et al. | |
| 2004/0184132 A1 * | 9/2004 | Novotny et al. | 359/290 |
| 2004/0190112 A1 * | 9/2004 | Huibers | 359/291 |
| 2005/0074919 A1 * | 4/2005 | Patel et al. | 438/107 |
| 2005/0157373 A1 * | 7/2005 | Aubuchon | 359/291 |

OTHER PUBLICATIONS

U.S. Appl. No. 10/627,302, filed Jul. 24, 2003.
U.S. Appl. No. 10/437,776, filed May 13, 2003.
U.S. Appl. No. 10/947,005, filed Sep. 21, 2004.
U.S. Appl. No. 10/305,631, filed Nov. 26, 2002.
U.S. Appl. No. 10/305,507, filed Nov. 26, 2002.
U.S. Appl. No. 11/090,800, filed Mar. 24, 2005.

* cited by examiner

MICROMIRROR ARRAY DEVICE WITH ELECTROSTATICALLY DEFLECTABLE MIRROR PLATES

CROSS-REFERENCE TO RELATED CASES

The present invention is a continuation-in-part of U.S. patent application Ser. No. 10/627,155 filed Jul. 24, 2003, now issued as U.S. Pat. No. 7,019,376 on Mar. 28, 2006, and U.S. patent application Ser. No. 10/437,776 filed May 13, 2003, now issued as U.S. Pat. No. 7,099,065 on Aug. 29, 2006, the subject matter of each being incorporated herein by reference.

TECHNICAL FIELD OF THE INVENTION

The present invention is related generally to the art of microelectromechanical systems, and, more particularly, to micromirror array devices comprising a plurality of micromirror devices for use in display systems.

BACKGROUND OF THE INVENTION

In current digital display systems employing spatial light modulators, lamps with intensive luminance but compact size are dominantly used as light sources of the display system. Arc lamps with short arc lengths are a group of such lamps. For example, an arc lamp with the arc length of 0.7 mm or 1.0 mm has a higher brightness than an arc lamp with an arc length of 1.3 mm or 1.6 mm, because the beam produced by smaller arc length lamps can be more easily passed through an optical system.

However, arc lamps in digital display systems prefer spatial light modulators with selected dimensions in favor of high optical efficiencies of the display systems. Specifically, for an arc lamp with a given arc length, it is desired for the spatial light modulator to have a large enough size—if the optical efficiency of the projection system (or more specifically, the optical coupling efficiency, to which the brightness of images produced by the spatial light modulator, of the light source to the array) is not to be degraded. A large spatial light modulator, however, is not cost-effective due to many factors, such as higher costs in manufacturing and optical elements (e.g. condensing and projection lenses). In practical design of the display system and the spatial light modulator, the cost-effectiveness and the optical efficiency need to be balanced—yielding an optimal size of the spatial light modulator.

The diameter of a spatial light modulator is proportional to the pixel pitch (defined as the center-to-center distance between adjacent pixels of the spatial light modulator) for a given resolution (defined as the number of pixels in the spatial light modulator) of the pixel array. Given a spatial light modulator with optimum size, the pixel pitch needs to be reduced if a higher resolution is desired. Because the pixel pitch is a summation of the gap between adjacent pixels and the size of the pixel, reduction of the pixel pitch requires reduction of the gap between adjacent pixels if fill factor (the percentage of reflective area to total array size and measured by a ratio of the pixel size to the pitch) is not to be lost.

However, reducing the pixel pitch (or the pixel size) to gain higher resolution in a spatial light modulator with given size is not a trivial task. For example, many of current micromirror-based spatial light modulators carry micromirrors each having a reflective deflectable mirror plate and two addressing electrodes for deflecting the mirror plates. Reduction the pixel pitch in a micromirror array certainly requires reduction of the pixel size when the gaps between adjacent pixels reach their limits. Reduction of the micromirror device size involves both of reductions of the mirror plate size and the size of the addressing electrodes, as well as the circuitry associated with the addressing electrodes. When the micromirror has two or more addressing electrodes, reducing the size of the addressing electrode becomes more difficult and even impossible with current fabrication technologies. Moreover, interference between the multiple addressing electrodes increases as the sizes and neighboring distances of the multiple addressing electrodes are reduced.

Therefore, what is needed is a spatial light modulator having an array of micromirror devices and a method of making such a spatial light modulator that allows for higher resolutions while maintain the same optimum size.

SUMMARY OF THE INVENTION

In view of the forgoing, the micromirror array device of the present invention comprises an array of deflectable reflective mirror plates disposed between a light transmissive substrate and a semiconductor substrate. Each mirror plate is associated with one single addressing electrode of an array of addressing electrodes for addressing and deflecting the mirror plate. The addressing electrode array is formed on the semiconductor substrate. The light transmissive substrate further comprises an electrode film that is light transmissive. Other alternative features, such as light absorbing/blocking films, anti-reflection films, getter and lubricant materials can also be fabricated on the light transmissive substrate.

In a number of embodiments of the invention, micromirror array device is constructed such that the center-to-center distance (referred to as pitch of the pixel array) between adjacent mirror plates is 10.16 micrometers or less. In other embodiments, micromirror array designs include micromirror arrays having a gap between adjacent micromirrors of 0.5 micrometers or less, and in other embodiments the gap is from 0.1 to 0.5 micrometer. In yet other embodiments, micromirrors are constructed that do not have symmetric ON and OFF positions. In still further embodiments, methods for making mirror arrays utilize spontaneous gas phase chemical etchants to provide mirrors having smaller than usual dimensions.

The objects of the invention are achieved in the features of the independent claims attached hereto. Preferred embodiments are characterized in the dependent claims.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

Figure 1:
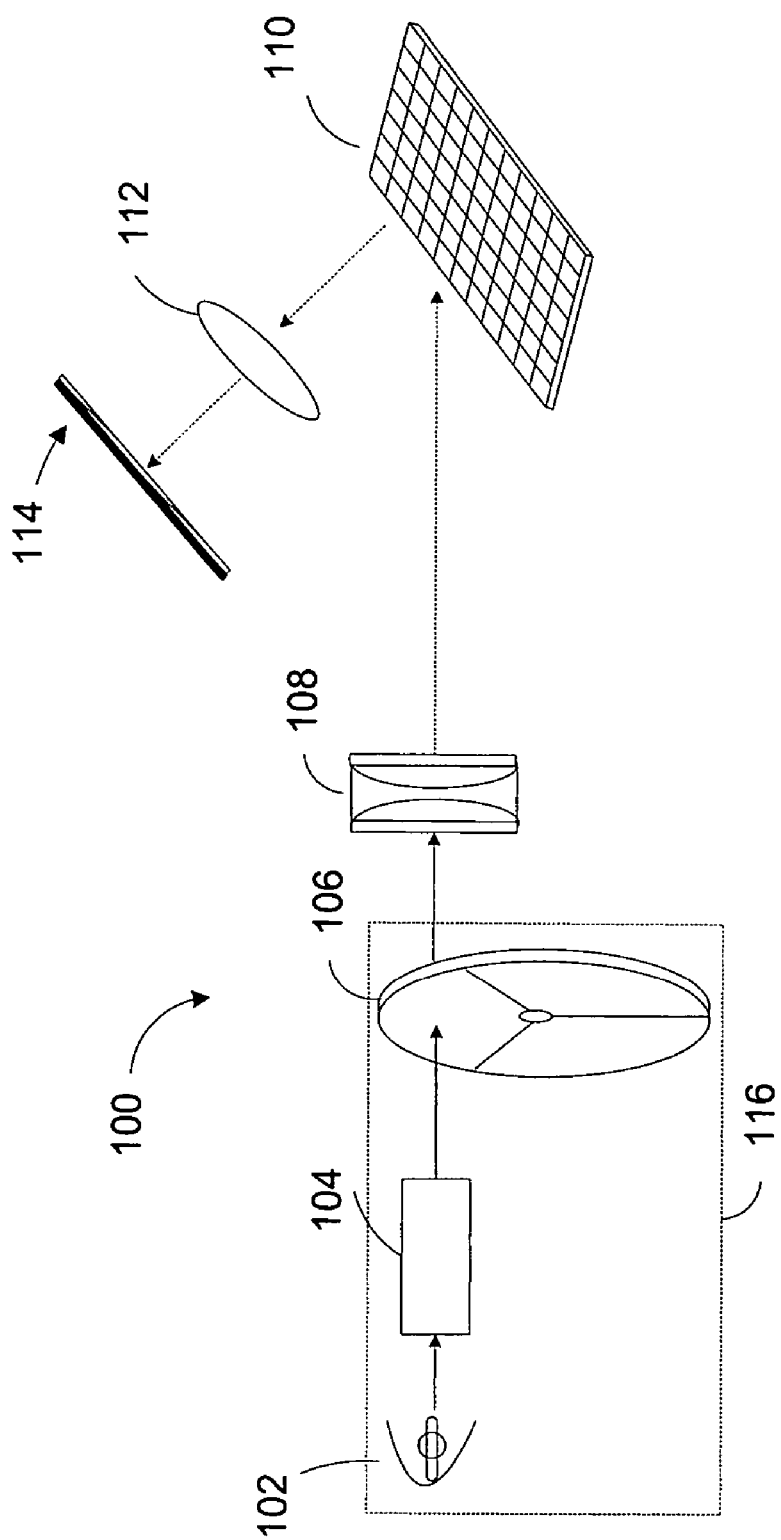
FIG. 1 diagrammatically illustrates an exemplary display system employing a spatial light modulator.

Turning to the drawings, FIG. 1 illustrates an exemplary display system employing a spatial light modulator in which embodiments of the invention can be implemented. In its basic configuration, display system 100 comprises illumination system 116 for producing sequential color light, spatial light modulator 110 that comprises an array of micromirrors, optical element 108 for directing illumination light from the illumination system onto the spatial light modulator, and optical element 112 that projects the reflected illumination light onto display target 114.

Illumination system 116 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be disposed between the light source and light pipe 104, which is not shown in the figure.

According to the invention, the light source of the display system is an arc lamp with a short arc length preferably 1.6 millimeters or less, more preferably 1.3 millimeters or less, more preferably 1.0 millimeters or less. The power of the arc lamp is preferably from 100 watts to 250 watts. Other light sources, such as LEDs can also be employed.

Figure 2:
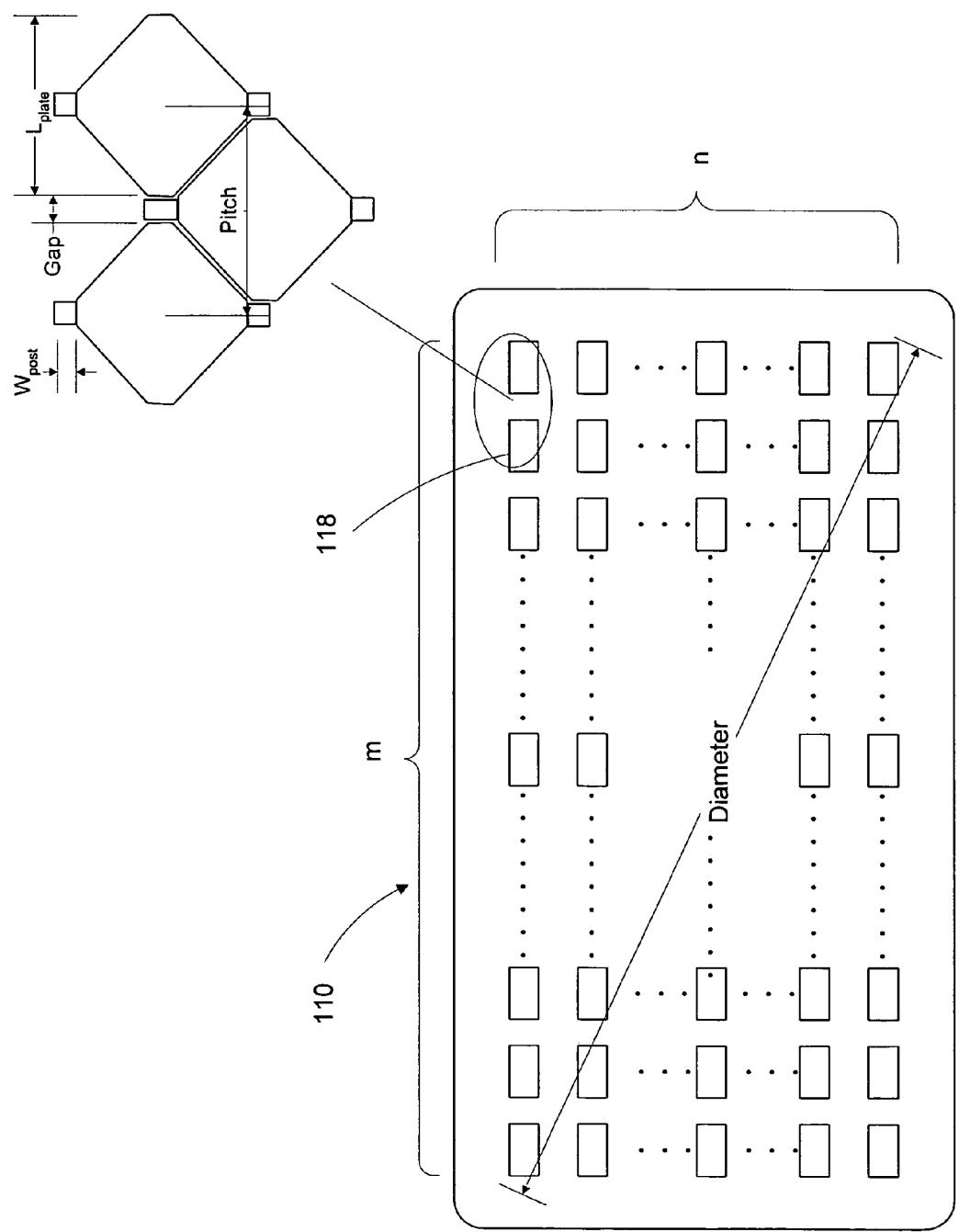
FIG. 2 is illustrates a exemplary spatial light modulator having an array of micromirrors.

The dimension of the micromirror array and the spatial light modulator is illustrated in FIG. 2. Referring to FIG. 2, spatial light modulator 110 comprises an array of micromirrors that has m×n micromirrors (e.g. micromirror device 118), wherein m and n respectively represent the number of micromirror devices in a row and a column of the array. The micromirror array also has a well defined diagonal, which is generally measured in inches. As shown in the insert figure, a gap and pitch is defined by two adjacent micromirrors. $L_{plate}$ measures the size of the micromirror, and $W_{post}$ measures the post area of the micromirror. The post area is the area in which posts for holding the mirror plate are formed. Though the insert figure illustrates the dimensions of the micromirror and the adjacent micromirrors with the micromirror of rectangular shape, those dimension definitions are applicable to any micromirrors and micromirror arrays.

Given the diameter of a micromirror array within a spatial light modulator, the pitch (defined as the center-to-center distance between adjacent micromirrors) of the micromirror array depends upon the resolution of the micromirror array, which can be expressed as:

$$\text{Pitch} = \frac{\text{Diameter}}{\sqrt{m^2 + n^2}} \quad \text{(Eq. 1)}$$

The diameter of the micromirror array depends upon two dimensional parameters—the diagonal of the mirror plate ($L_{plate}$) of the micromirror and the gap between adjacent micromirrors, as defined in FIG. 2. Of the two parameters, the gap degrades the optical efficiency of the micromirror in reflecting light. This type of degradation can be analyzed in terms of illumination efficiency, which is defined as the ratio of the total effective reflective area to the total area of the micromirror array. Specifically, the illumination efficiency (eff) can be expressed as:

$$\textit{eff} = \frac{(pitch - gap)^2 - 2 \times W_{post}^2}{pitch^2} \quad \text{(Eq. 2)}$$

wherein the term $(pitch-gap)^2 - 2 \times W_{post}^2$ is the total effective reflection area of the micromirrors of the micromirror array, and $pitch^2$ is the total area of the micromirrors of the micromirror array.

To be compatible with an arc lamp as the light source of the display system, while satisfying the cost-effectiveness requirement, the spatial light modulator has optimum diameters. According to the invention, in a display system using an arc lamp with an arc length around 1.0 mm, the diameter of the micromirror array is preferably from 0.55 inch to 0.8 inch, more preferably from 0.65 to 0.75 inch, and more preferably around 0.7 inch. The pitch size of the micromirror array device is preferably from 4.38 μm to 10.16 μm, preferably from 4.38 μm to 9.34 μm, and preferably from 4.38 μm to 6.57 μm, and preferably from 6.23 μm to 9.34 μm, and more preferably from 8.07 μm to 10.16 μm. It is also preferred that the gap between adjacent micromirrors is 0.5 μm or less, more preferably, from 0.25 μm to 0.5 μm, and more preferably from 0.15 μm to 0.25 μm, as set forth in U.S. patent application Ser. No. 10/627,155 filed Jul. 24, 2003 (now U.S. Pat. No. 7,019, 376), the subject matter being incorporated herein by reference.

As discussed above, in view of the optical efficiency and cost-effectiveness of the display system, the micromirror array within the spatial light modulator of the display system has an optimum diameter. For a micromirror array with the optimum diameter, it is desired to reduce the pitch size of the micromirror array in order to accommodate more micromirrors for achieving higher resolutions. Because the optimum pitch is a summation of the length of the micromirror and the gap between adjacent micromirrors, the reduction of the pitch can be achieved by either reducing the micromirror size or the gap between adjacent micromirrors. Reducing the mirror size, however, requires reduction of the associated addressing electrode(s) and circuitry. When multiple addressing electrodes are used in deflecting one single mirror plate, reduction of the mirror plate size is severely restrained from the reduction of the addressing electrodes due to fabrication technologies and the intrinsic limitations in semiconductor circuits. To enable the reduction of the addressing electrode in size, which in turn enables the reduction of the mirror plate in size, the mirror plate is associated with one single addressing electrode. Moreover, the micromirror device can be constructed such that the mirror plate of the micromirror device rotates asymmetrically. Specifically, the maximum rotation angle (e.g. the ON state angle) achieved by the mirror plate in one direction is larger than the other maximum angle (e.g. the OFF state angle) achievable by the mirror plate in the other direction, as set forth in U.S. patent application Ser. No. 10/627,155 filed Jul. 24 (now U.S. Pat. No. 7,019,376), 2003, the subject matter being incorporated herein by reference.

Figure 3:
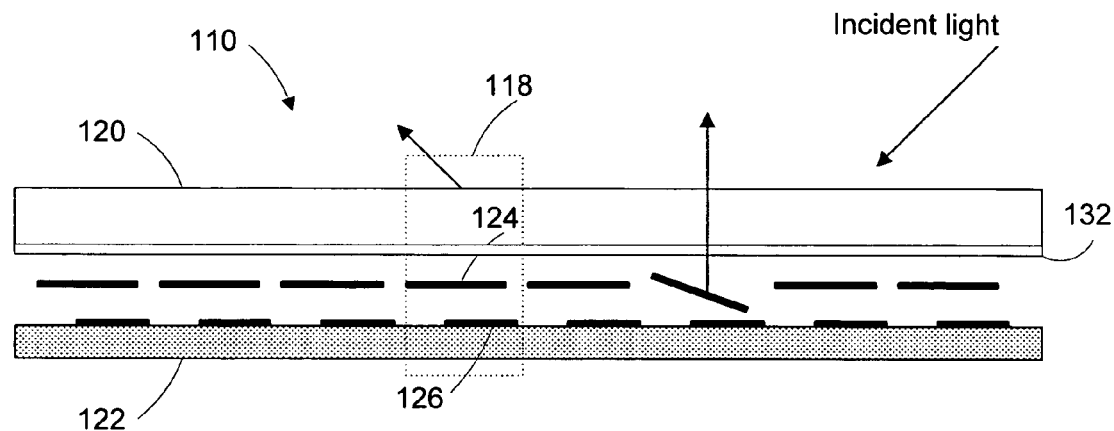
FIG. 3 illustrates a cross-sectional view of an exemplary spatial light modulator of FIG. 1.

Referring to FIG. 3, a cross-sectional view of an exemplary spatial light modulator having an array of micromirror devices is illustrated therein. Spatial light modulator 110 comprises substrate 120 that is transmissive to the incident light to be modulated (e.g. the visible light), semiconductor substrate 122, and an array of reflective deflectable mirror plates (e.g. mirror plate 124) disposed between the two substrates. Each of the mirror plates is associated with one single addressing electrode (e.g. addressing electrode 126) of an array of addressing electrodes for addressing and deflecting the mirror plate. The array of addressing electrodes is formed on substrate 122. In order to main a uniform distance between the mirror plates and addressing electrodes, substrates 120 and 122 are bonded together. Specifically, the two substrates can be bonded hermetically or non-hermetically with any suitable bonding agents, such as epoxy. In addition to the addressing electrodes, electrode 132 is provided on the light transmissive substrate 120 for driving the mirror plates to rotate in a direction opposite to the direction driven by the addressing electrodes. Specifically, the addressing electrodes are designated for rotating the mirror plates to the ON state, while electrode 132 is designated for rotating the mirror plates to the OFF state.

In the embodiment of the invention, the ON state angle is 10° degrees or more, or 12° degrees or more, such as 14° degrees or more, 16° degrees or more relative to the major surface of substrate 120. The OFF state can be 0° degree (in parallel to substrate 120), or −1° degree or more, such as −1.5° degrees, −2° degrees or more, or −4° degrees or more. The minus sign "−" represents the opposite rotation direction of the mirror plate to the ON state.

Because electrode 132 is formed on the light transmissive substrate 120, electrode 132 is electrically conductive and transmissive to the incident light (e.g. the visible light). Electrode 132 can be a multilayered optical film comprising an electrically conductive layer and an electrically insulating layer that prevents electrical short between the mirror plates and electrode 132. Of course, other optical film can also be provided. For example, another optical layer enforcing the adhesiveness of the electrically conductive and insulating layers to the light transmissive substrate, and/or another electrically insulating layer, and/or another optical layer for improving the transmission of the incident light can be provided. As a way of example, electrode 132 may comprise a titanium dioxide layer, first silicon dioxide layer, an indium-titanium-oxide (ITO) layer, and second silicon dioxide layer. In another example, electrode 132 may comprise a niobium dioxide layer, first silicon dioxide layer, an indium-titanium-oxide (ITO) layer, and second silicon dioxide layer, as set forth in U.S. patent application "Optical Coating on Light Transmissive Substrate of Micromirror Devices", filed Apr. 8, 2005 (now U.S. Pat. No. 7,295,363), the subject matter is incorporated herein by reference. In particular, electrode 132 can be formed as a continuous optical film, or a frame, a grid, a set of strips, a set of electrical conductive pads, and a combination thereof, which will not be discussed in detail herein.

In addition, other optical films, such as anti-reflective layer for improving the transmission of the incident light through the light transmissive substrate can be provided on the light transmissive substrate. Alternatively, a light blocking/absorbing mask can be formed for blocking/absorbing the light around the edges of the micromirrors or the micromirror array. Specifically, the light absorbing/blocking film can be deposited around the circumference of the light transmissive substrate. Such light absorbing/blocking layer can be in a form of frame, grid, set of strips, set of pads, or any combination thereof, which will not be discussed in detail herein.

The reflective deflectable mirror plates of the spatial light modulator can be formed between the two substrates (substrates 120 and 122) in many ways. For example, the mirror plates can be formed on the light transmissive substrate, which will be discussed in detail with examples in FIGS. 4 to 14c. Alternatively, the mirror plates can be formed on the same substrate (e.g. the semiconductor substrate) as the addressing electrodes. For another example, the mirror plates can be derived from a single crystal material, such as single crystal silicon, as set forth in U.S. patent applications Ser. No. 11/056,732 (now U.S. Pat. No. 7,215,459); Ser. No. 11/056,727 (now U.S. Pat. No. 7,119,944); and Ser. No. 11/056,752 (now US publication 2005/0157375), all filed Feb. 11, 2005, the subject matter of each being incorporated herein by reference.

Figure 4:
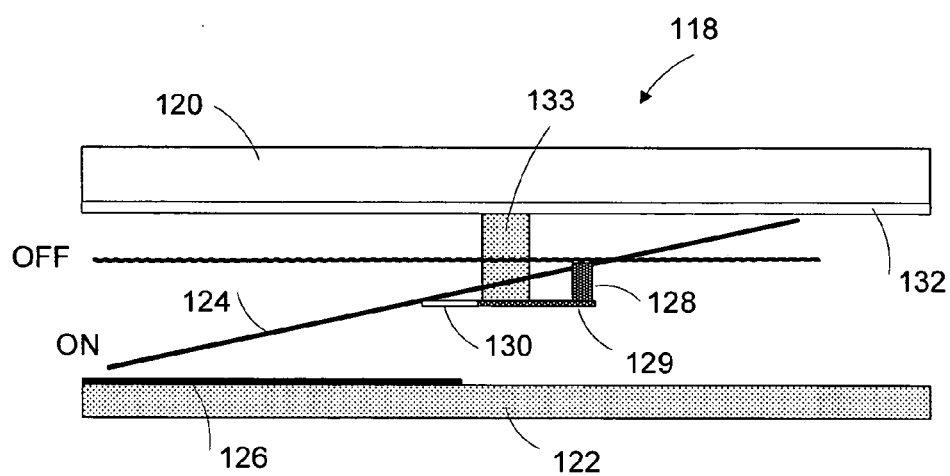
FIG. 4 is an exploded cross-sectional view of an exemplary micromirror in FIG. 3.

In accordance with an embodiment of the invention, the mirror plates are formed on the light transmissive substrate 120, as shown in FIG. 4. Alternatively, the mirror plates can be formed on the semiconductor substrate 122, in which situation, the light transmissive substrate 120 is provided for protecting the mirror plates, and providing electrode 132.

Referring to FIG. 4, an exemplary micromirror device of the micromirror array device in FIGS. 2 and 3 is illustrated therein. Micromirror device 118 comprises deflectable mirror plate 124 having a reflective surface for reflecting the incident light to be modulated. The mirror plate is attached to deformable hinge 129 (e.g. a torsion hinge) via hinge contact 128. The deformable hinge is held and supported by post 133 formed on substrate 120 such that the mirror plate can be deflected (rotated) relative to substrate 120. For addressing and deflecting the mirror plate, addressing electrode 126 is disposed proximate to the mirror plate such that an electrostatic field can be established between the mirror plate and addressing electrode. The mirror plate can be rotated by an torque from an electrostatic force derived from the electrostatic field, as set forth in U.S. patent application Ser. No. 10/947,005 filed Sep. 21, 2004 (now U.S. Pat. No. 7,113,322), and U.S. patent application Ser. No. 10/982,259 filed Nov. 5, 2004 (now U.S. Pat. No. 7,215,458), the subject matter of each being incorporated herein by reference in entirety.

The light transmissive substrate 120 comprises an electrode (e.g. electrode 132) for pulling the mirror plate towards the light transmissive substrate. This electrode on the light transmissive substrate is transmissive to the incident light. Specifically, the electrode transmits 90% or more, or 99% or more of the incident light (e.g. visible light). The electrode can be formed as a film, a strip, a grid, or a set of discontinuous segments, as set forth in U.S. patent application Ser. No. 10/437,776 filed May 13, 2003 (now U.S. Pat. No. 7,099,065), and Ser. No. 10/947,005 filed Sep. 21, 2004 (now U.S. Pat. No. 7,113,322), the subject matter of each being incorporated herein by reference in entirety.

In accordance with an embodiment of the invention, only one addressing electrode 126 is provided for the micromirror for switching the mirror plate between the ON and OFF state according to the image data of the desired image to be produced by the system. Of course, multiple addressing electrodes can be provided for each micromirror, which will not be discussed in detail herein.

Stopper 130 can be provided as an alternative feature to limit the rotation of the mirror plate in accordance with the operation states, such as the ON state when the micromirror is operated in a binary mode including the ON and OFF state. The stopper 130 can be formed in many alternative ways, such as those set forth in U.S. patent applications Ser. No. 10/437,776 filed Apr. 13, 2003 (now U.S. Pat. No. 7,099,065) and Ser. No. 10/613,379 filed Jul. 3, 2003 (now U.S. Pat. No. 6,873,450), Ser. No. 10/703,678 filed Nov. 7, 2003 (now U.S. Pat. No. 6,876,485), the subject matter of each being incorporated herein by reference.

In operation, the mirror plate switches between the ON and OFF state according to the image data so as to reflect the incident light into different directions. As an example, the mirror plate is rotated to the ON state by setting the electrical voltage on the addressing electrode 126 to a value such that the rotation torque derived from the voltage difference between the mirror plate and the addressing electrode is sufficient enough to overcome the total resisting torque including the mechanical torque in the deformable hinge and the electrical torque derived from the voltage difference between the mirror plate and the electrode 210 on the light transmissive substrate. When the voltage difference between the mirror plate and addressing electrode is removed, or reduced to a value that can not balance the total resisting torque including the mechanical torque of the deformed hinge and the electrical torque derived from the voltage difference between the mirror plate and electrode 210 on the light transmissive substrate, the mirror plate rotates towards the OFF state.

In order to allow for further reduction of the gap between adjacent micromirrors of the micromirror array, the micromirror of the present invention can be designed such that the mirror plate of the micromirror rotates asymmetrically along a rotation axis, because asymmetric rotation allows for a smaller gap than the symmetric rotation. Moreover, the distance between the mirror plate and the rotation axis is as small as compared to the distance between the mirror plate and the substrate on which the mirror plate is formed, as set forth in U.S. patent applications Ser. No. 10/627,302 (now U.S. Pat. No. 6,965,468), Ser. No. 10/627,155 (now U.S. Pat. No. 6,980,347), and Ser. No. 10/627,303 (now U.S. Pat. No. 7,019,376), all filed Jul. 24, 2004, the subject matter of each being incorporated herein by reference in entirety. In accordance with an embodiment of the invention, the reflective deflectable mirror plate is on the separate plane as the deformable hinge, and the vertical distance between the mirror plate and the hinge (i.e. the distance between the planes of the mirror plate and deformable hinge) is preferably from 0.15 to 0.45 micrometers, e.g. from 0.15 to 0.25 micrometers, or from 0.25 to 0.45 micrometers. Larger distance between the mirror plate and the hinge could also be used, such as a distance from 0.5 to 1.5 micrometers, or from 0.5 to 0.8 micrometers, or from 0.8 to 1.25 micrometers, or from 1.25 to 1.5 micrometers.

Figure 5:
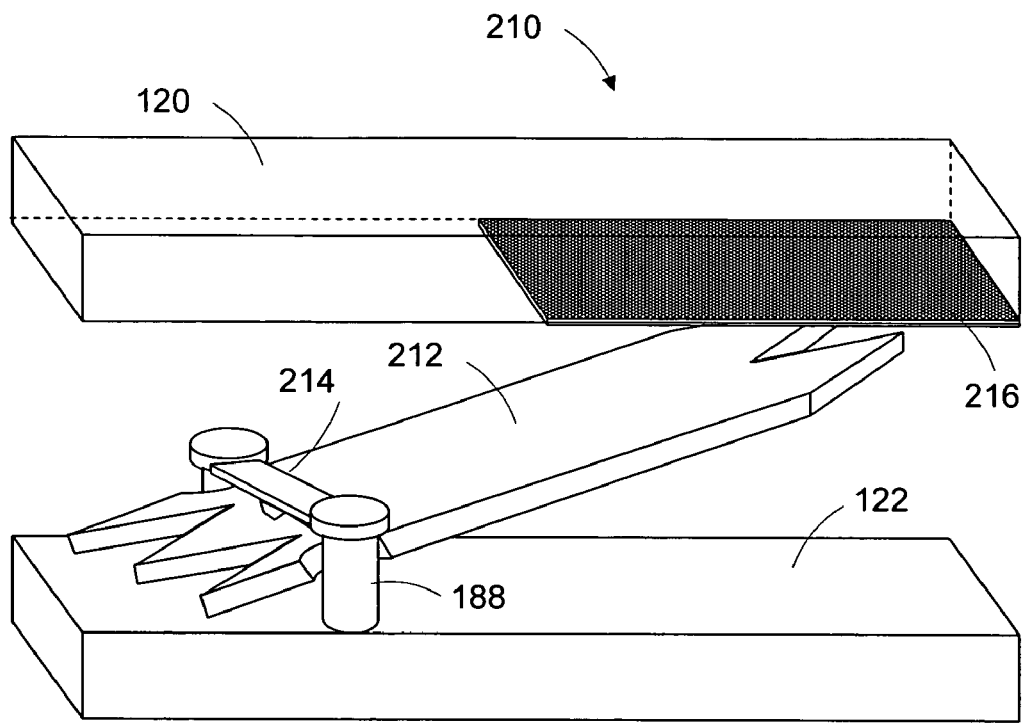
FIG. 5 illustrates a perspective view of an exemplary micromirror device having the cross-sectional view of FIG. 4.

Referring to FIG. 5, a perspective view of an exemplary micromirror device in which embodiments of the invention are applicable is illustrated therein. Micromirror device 210 comprises substrate 120 that is a light transmissive substrate such as glass or quartz and semiconductor substrate 122. Deflectable and reflective mirror plate 212 is spaced apart and attached to deformable hinge 214 via a hinge contact. The deformable hinge is affixed to and held by posts 188. The semiconductor substrate has addressing electrode 216 for deflecting the mirror plate. In this particular example, the light transmissive substrate operates as a stopper for stopping the rotation of the mirror plate at the ON state.

Figure 6:
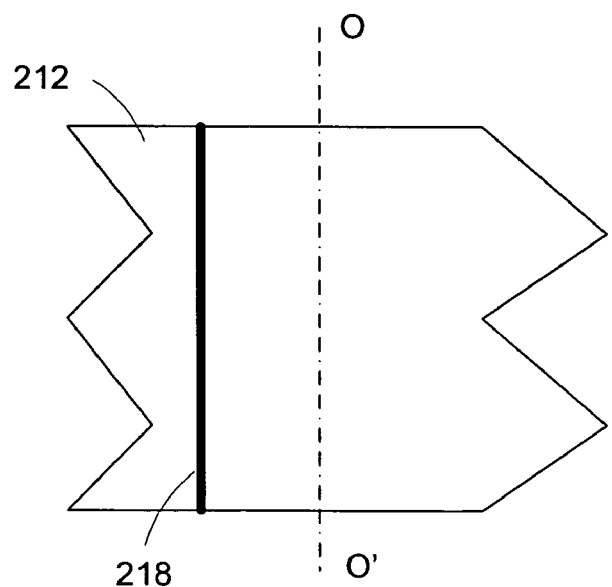
FIG. 6 is a top view of the mirror plate in FIG. 5.
Figure 7:
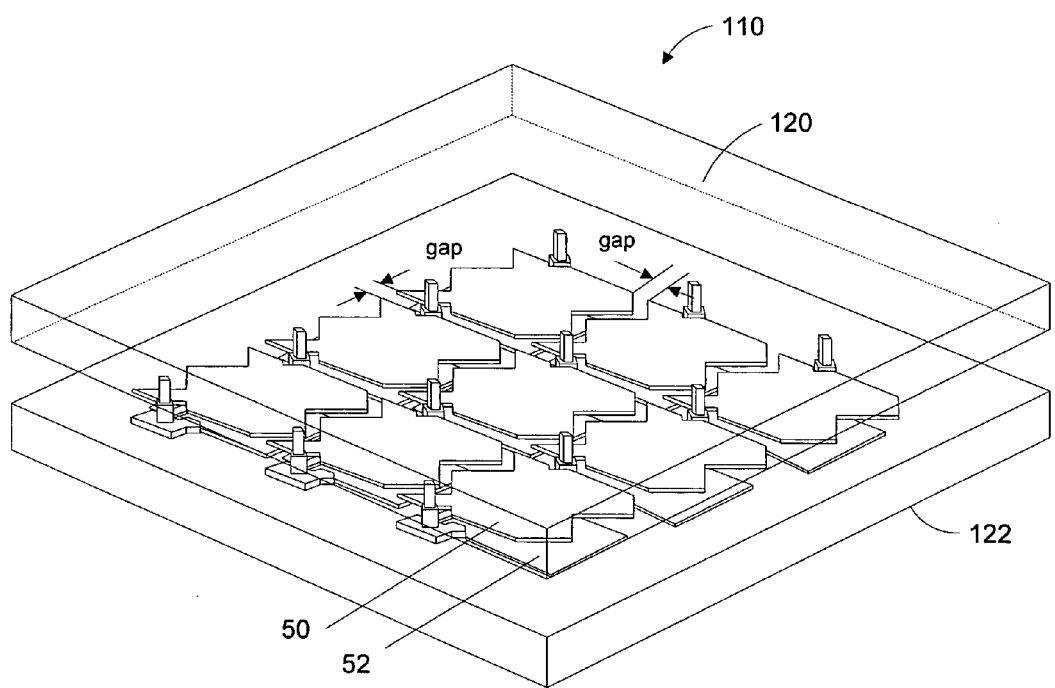
FIG. 7 illustrates a perspective view of a spatial light modulator having an array of micromirrors in FIG. 4.

A top view of the micromirror in FIG. 7 is illustrated in FIG. 6. As can be seen in FIG. 6, deformable hinge 218 is not along but offset from the symmetrical axis OO' of the mirror plate such that the mirror plate is operable to rotate asymmetrically. The deformable hinge is located beneath the mirror plate in the direction of the incident light. That is, the mirror plate is located between the light transmissive substrate and the deformable hinge such that the deformable hinge is not illuminated by the incident light so as to prevent unexpected light scattering from the deformable hinge, thereby, increasing the contrast ratio of the produced image. The quality of the produced image is further improved through reduction of the light scattering from the edges of the mirror plate by forming the edges of the mirror plate into zigzagged shape, as shown in the figure.

The deflectable and reflective mirror plate can be a multi-layered structure. For example, the mirror plate may comprise an electrical conducting layer, a reflective layer that is capable of reflecting 85% or more, or 90% or more, or 85% or more, or 99% or more of the incident light (e.g. incident visible light), a mechanical enhancing layer that enhances the mechanical properties of the mirror plate. For example, the mirror plate may comprise a $SiO_2$ layer, an aluminum layer, a titanium layer, and a titanium nitride layer. When the aluminum layer is to be deposited on the $SiO_2$ layer, diffusion between the aluminum layer and $SiO_x$ layer may occur. This can be avoided by depositing a barrier layer therebetween.

A micromirror array device, such as spatial light modulator 110 in FIG. 1, comprising the micromirror in FIG. 5 is illustrated in FIG. 7. Referring to FIG. 7, spatial light modulator 110 comprises an array of micromirrors 50 each having a reflective deflectable mirror plate for reflecting the incident light. Addressing electrode array 52 is disposed proximate to the micromirror array for addressing and deflecting the reflective deflectable mirror plates. The light transmissive substrate 120, on which the micromirrors are formed, further comprises a light transmissive electrode for pulling the mirror plates towards the light transmissive substrate.

Figure 8:
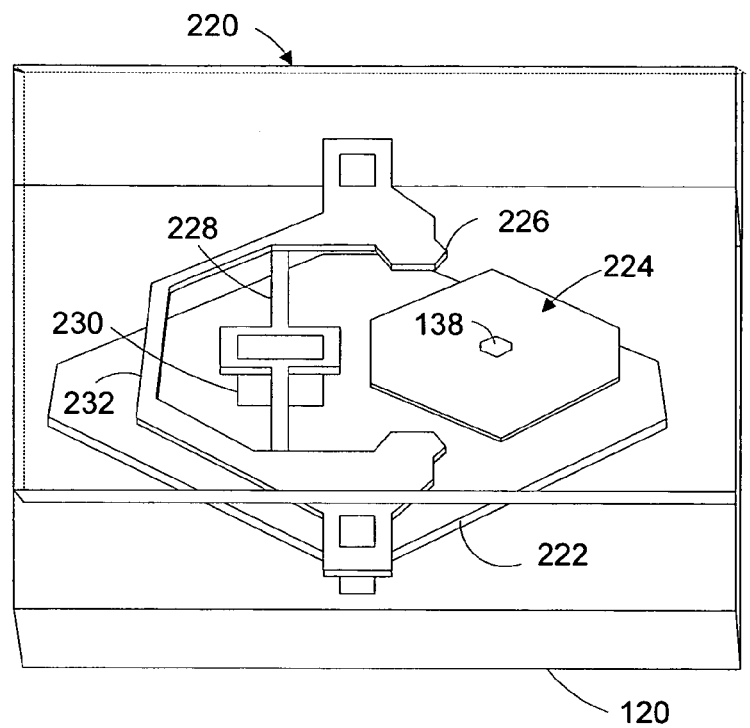
FIG. 8 illustrates a perspective view of an exemplary micromirror device having the cross-sectional view of FIG. 4.

Another exemplary micromirror device having a cross-sectional view of FIG. 4 is illustrated in its perspective view in FIG. 8. Referring to FIG. 8, deflectable reflective mirror plate 222 with a substantially square shape is formed on light transmissive substrate 120, and is attached to deformable hinge 228 via hinge contact 230. The deformable hinge is held by hinge support 232, and the hinge support is affixed and held by posts on the light transmissive substrate. For electrostatically deflecting the mirror plate, an addressing electrode (not shown in the figure for simplicity purposes) is fabricated in the semiconductor substrate 122. For improving the electrical coupling of the deflectable mirror plate to the electrostatic field, extending metallic plate 224 can be formed on the mirror plate and contacted to the mirror plate via post 138.

Figure 9:
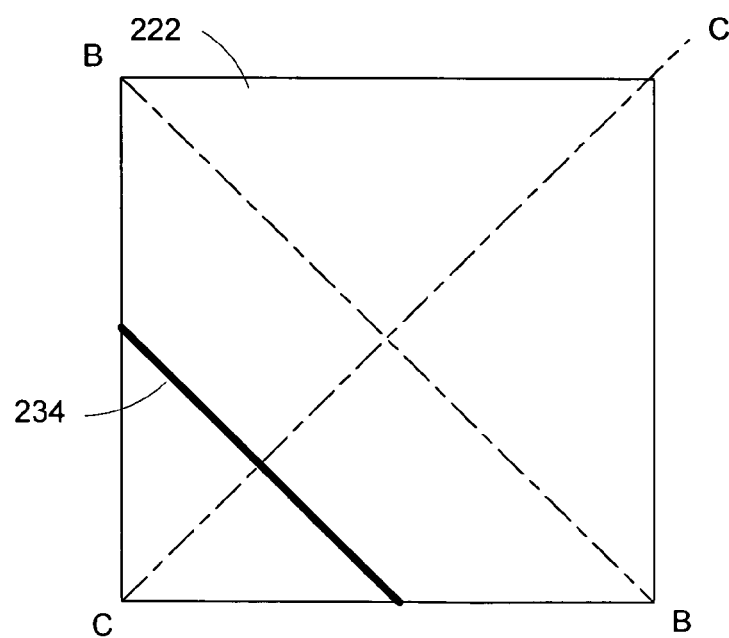
FIG. 9 is a top view of the mirror plate in FIG. 8.

The mirror plate is preferably attached to the deformable hinge asymmetrically such that the mirror plate can be rotated asymmetrically in favor of high contrast ratio. The asymmetric attachment is better illustrated in FIG. 9. Referring to FIG. 9, mirror plate comprises diagonals BB and CC. Deformable hinge is disposed with its length parallel to a diagonal (e.g. BB) of the mirror plate. However, the length of the deformable is not along any diagonal of the mirror plate in the top view when the mirror plate is parallel to the light transmissive substrate. Of course, the mirror plate can be attached to the deformable hinge symmetrically by placing the attachment point around the geometric or mass center of the mirror plate, which will not be discussed in detail herein.

Similar to that in FIG. 6, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

The micromirrors as discussed above are particular examples among many applicable examples, which may have other features. For example, a micromirror device may also comprise a stop retarding mechanism, as set froth in U.S. patent application Ser. No. 10/944,379 filed Sep. 16, 2004, the subject matter being incorporated herein by reference. Specifically, the stop retarder of the micromirror reduces the rotation speed (angular speed) of the mirror plate as the mirror plate approaching the desired state, such as the ON state, thus preventing abrupt change of the angular momentum of the rotating mirror plates of the micromirrors, because the abrupt change in the angular momentum has many disadvantages, one of which is possibilities of resulting in in-site stiction.

The in-site stiction of the mirror plate in the presence of a stopping mechanism can also be eliminated using voltage refresh pulses, as set forth in U.S. patent application Ser. No. 11/069,317 filed Feb. 28, 2005 (now US publication 2006/0193028), the subject matter being incorporated herein by reference. Specifically, refresh pulses are applied to the micromirrors so as to produce additional mechanical restoration forces in the micromirrors. The additional mechanical restoration force is added to the restoration force in the micromirrors so as to enhance the restoration force. In the instance of operating an array of micromirrors, reparation procedures are initiated according to a predetermined schedule. In each reparation procedure, voltages of the micromirrors of the array are set to values such that the micromirrors are expected to be at the OFF state. Refresh voltage pulses are then applied to the micromirrors of the array. In the presence and after the application of the refresh voltage pulse, the micromirrors at the OFF state are not affected, and maintain their positions at the OFF state. However, the stuck micromirrors due to the in-site stiction are further deflected so as to produce additional deformation, under which additional mechanical restoration energy can be derived. The additional restoration energy is added to the stored restoration energy in the micromirrors and thus, helping to drive these stuck micromirrors to the OFF state.

For liberating all stuck micromirrors, the refresh voltage pulses applied each time preferably comprise two consecutive pulses with the time interval therebetween is longer than the intrinsic time period of the micromirrors, such as the reciprocal of the resonant frequency of the micromirrors. Of course, the time interval between the two consecutive refresh voltage pulses can be shorter than the intrinsic time period of the micromirrors. The reparation procedure can be carried out during each frame period. Alternatively, it can be performed at any predetermined time period.

The reparation procedure can be incorporated with other procedures, such as bias inversion that is performed primarily for eliminating static charge accumulation. For example, the polarity of the bias voltage (the voltage of the deflectable mirror plate) can be inversed at predetermined times during operation so as to dynamically eliminate accumulated static charge in the micromirror. During the course of the bias voltage inversion, first refresh voltage pulse can be applied so as to liberate the stuck micromirrors from stiction followed by the application of the second refresh voltage pulse. The two refresh voltage pulses preferably have opposite polarities, and have a time interval therebetween of longer than the intrinsic time (e.g. the reciprocal of the resonant frequency) of the micromirrors but shorter than the time to complete the inversion.

Figure 10:
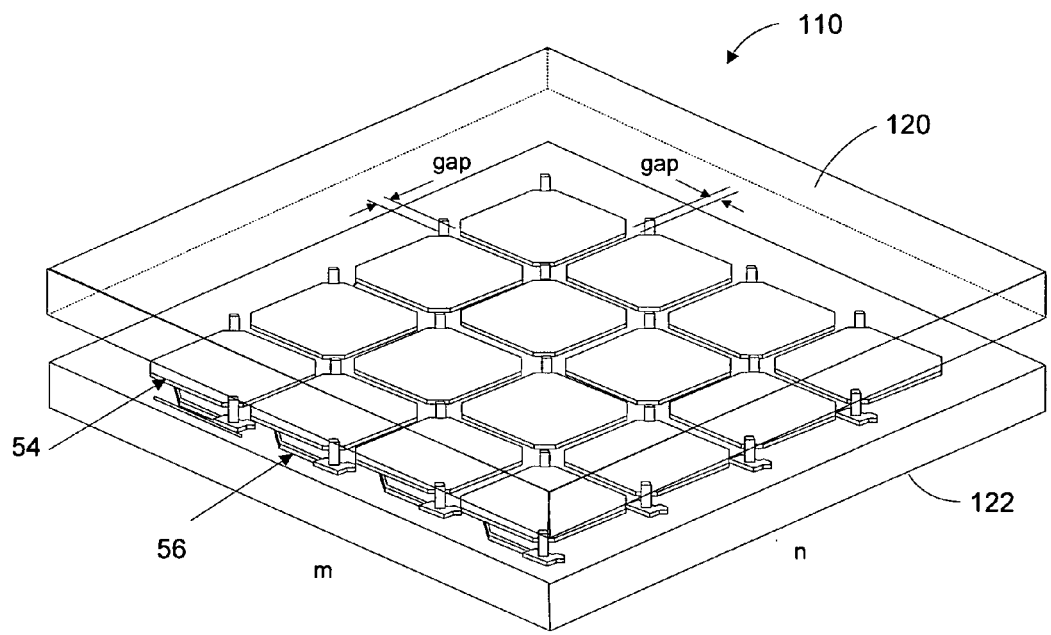
FIG. 10 illustrates a perspective view of a spatial light modulator having an array of micromirrors in FIG. 8.

Referring to FIG. 10, an exemplary spatial light modulator having an array of micromirrors of FIG. 10 is illustrated therein. For simplicity purposes, only 4×4 micromirrors are presented. In this example, micromirror array 54 is formed on light transmissive substrate 120; and addressing electrode and circuitry array 56 is formed on semiconductor substrate 122 for deflecting the micromirrors in the micromirror array. The deformable hinges of the micromirrors, as well as the addressing electrodes are hidden from the incident light.

Figure 11:
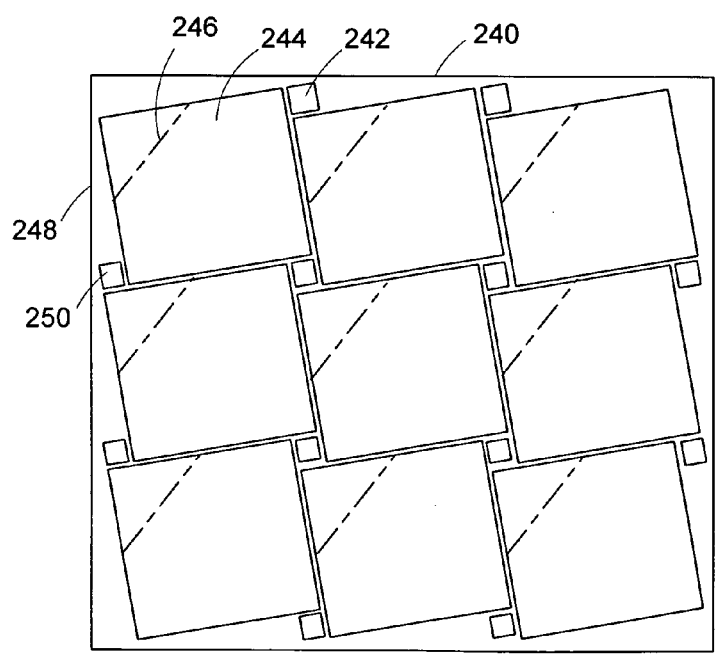
FIG. 11 illustrates a top view of another exemplary micromirror array.

The micromirrors in the micromirror array of the spatial light modulator can be arranged in alternative ways, another one of which is illustrated in FIG. 11. Referring to FIG. 11, each micromirror is rotated around its geometric center an angle less than 45° degrees. The posts (e.g. 242 and 250) of each micromirror (e.g. mirror 244) are then aligned to the opposite edges of the mirror plate. No edges of the mirror plate are parallel to an edge (e.g. edges 240 or 248) of the micromirror array. The rotation axis (e.g. axis 246) of each mirror plate is parallel to but offset from a diagonal of the mirror plate when viewed from the top of the mirror plate at a non-deflected state.

Figure 12:
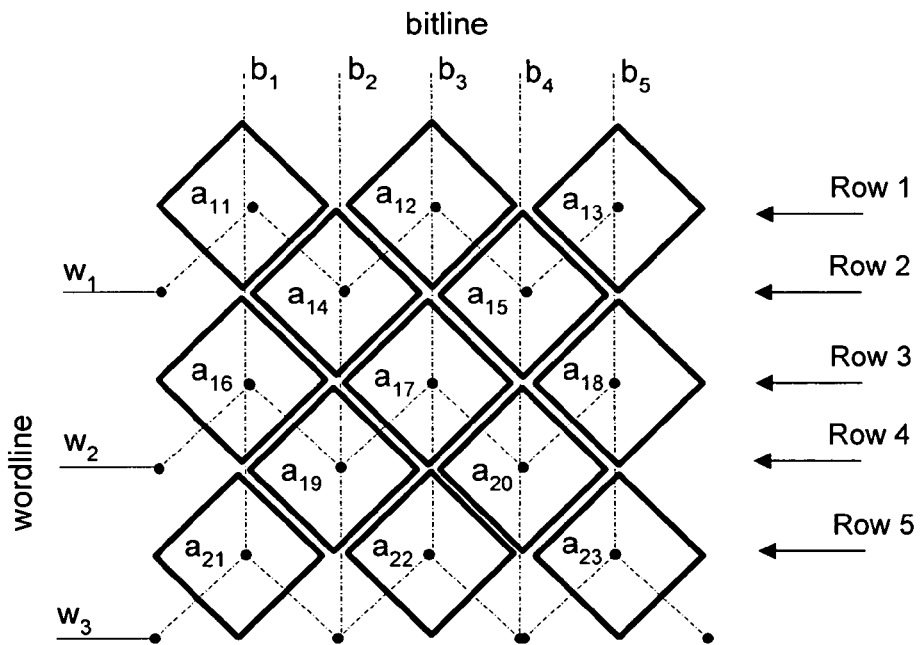
FIG. 12 illustrates a top view of yet another exemplary micromirror array.

FIG. 12 illustrates the top view of another micromirror array having an array of micromirrors of FIG. 8. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less the total number of bitlines.

Figure 13:
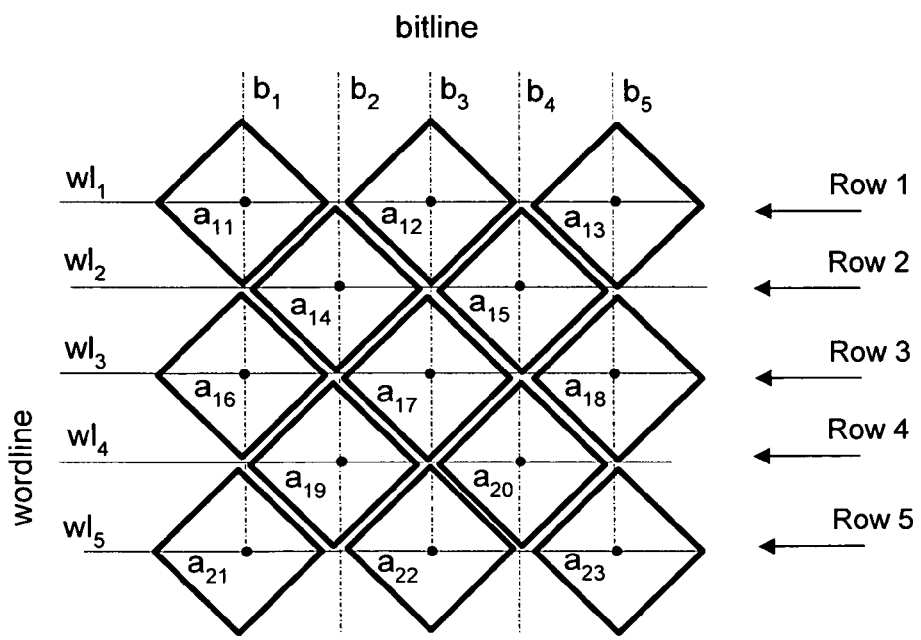
FIG. 13 illustrates a top view of yet another exemplary micromirror array.

For the same micromirror array, the bitlines and wordlines can be deployed in other ways, such as that shown in FIG. 13. Referring to FIG. 13, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 14A:
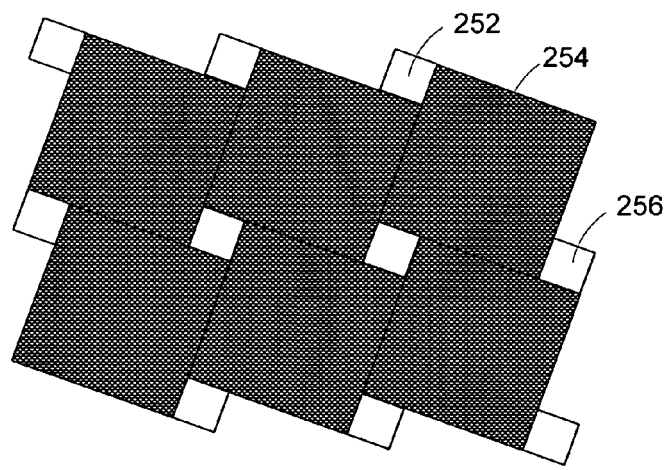
FIGS. 14a to 14c illustrate top views of yet another exemplary micromirror array.
Figure 14B:
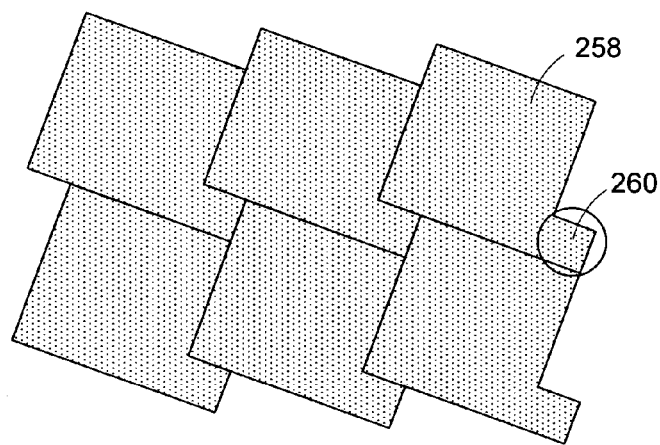
Figure 14C:
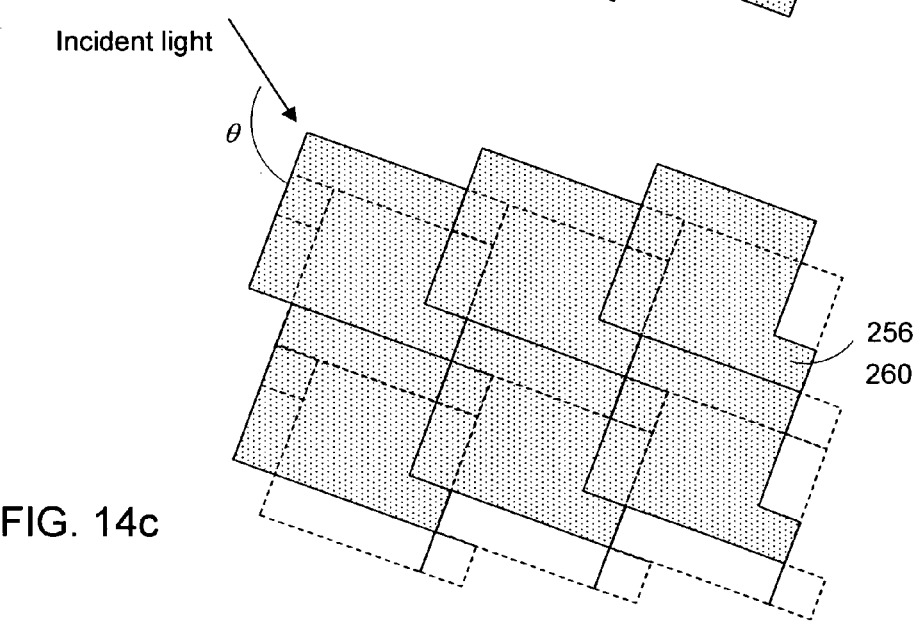

According to another embodiment of the invention, the mirror plates of the micromirrors in the array can form a plurality of pockets, in which posts can be formed, wherein the pockets are covered by the extended areas of the addressing electrodes when viewed from the top of the micromirror array device, as shown in FIGS. 14a to 14c.

Referring to FIG. 14a, a portion of an array of mirror plates of the micromirrors is illustrated therein. The mirror plates in the array form a plurality of pockets in between. For example, pockets 252 and 256 are formed in which posts for supporting and holding mirror plate 254 can be formed. For individually addressing and deflecting the mirror plates in FIG. 14a, an array of addressing electrodes is provided, a portion of which is illustrated in FIG. 14b.

Referring to FIG. 14b, each addressing electrode has an extended portion, such as extended portion 260 of addressing electrode 258. Without the extended portion, the addressing electrode can be generally square, but having an area equal to or smaller than the mirror plate.

FIG. 14c illustrates a top view of a micromirror array device after the addressing electrodes in FIG. 14b and the mirror plates in FIG. 14a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

Figure 15:
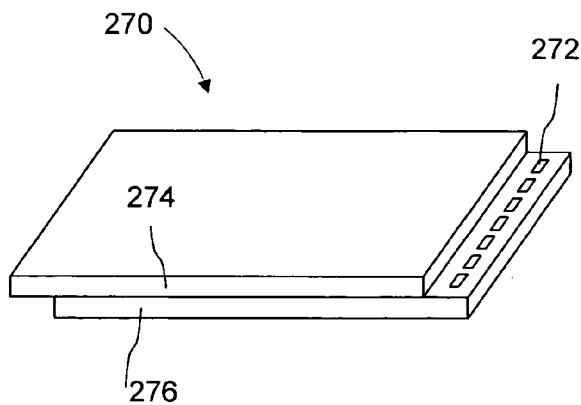
FIG. 15 illustrates in a perspective view of an exemplary micromirror assembly according to an embodiment of the invention.

As discussed earlier with reference to FIGS. 3 and 4, the micromirrors are operated under electrostatic fields between the mirror plates and addressing electrodes, and between the mirror plates and the transparent electrodes (e.g. 132 in FIG. 3 and FIG. 4). This requires electrical connections of the functional members, such as the mirror plates and transparent electrodes to external power and signal sources. However, because of the complexity and delicateness of the functional members (e.g. the mirror plates, hinges, addressing electrodes and the circuitry associated with the addressing electrodes), electrical connection to the functional members are preferably extended into an area away from the space in which the functional members are disposed. An exemplary configuration of electrical contact is illustrated in FIG. 15, as set forth in U.S. patent application "Electrical Contacts in Micromechanical Devices with Multiple Substrates", filed Apr. 8, 2005 (now U.S. Pat. No. 7,110,160), the subject matter being incorporated herein by reference.

Referring to FIG. 15, substrate 274 having an array of deflectable reflective mirror plates are assembled with substrate 276 having an array of addressing electrodes and circuitry. The two substrates are assembled in a way such that the assembly has a ledge on one of the two substrates (e.g. in substrate 276 in this example). The ledge, instead of being enclosed in the space (e.g. the space between the two substrate) in which the functional members are disposed, is outside the space and exposed to environment. A set of electrical contacting pads 272 is deployed on the ledge. With such configuration, external power sources and signal sources, such as data and control signal sources can be easily connected to the electrical contacting pads, through which the external power sources and signals can be transferred to the functional members enclosed within the space between the two substrates of the device.

Figure 16:
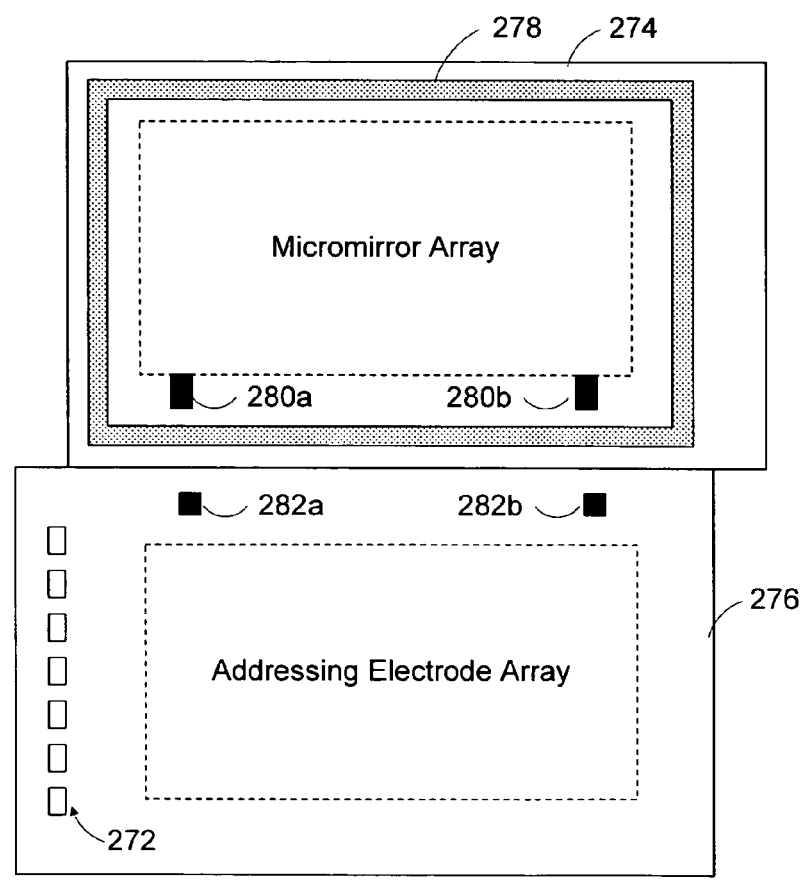
FIG. 16 illustrates top views of the tow substrates of the assembly in FIG. 15.

There are many ways to extend the electrical contact of the enclosed functional members to the electrical contacting pads 272 on the assembly ledge. FIG. 16 illustrates one example. Referring to FIG. 16, substrate 274 having thereon the array of deflectable reflective mirror plates comprises a bonding pad 280 a that is electrically conductive. Substrate 276 having formed on an array of addressing electrodes and circuitry comprises a bonding pad 282a that is electrically conductive. The bonding pads 280a and 282a are located such that when substrates 120 and 122 are bonded together in assembling, bonding pads 280a and 282a are aligned and bonded together so as to bond the two substrates. Bonding pad 282a is electrically connected to the functional members on the substrate 120, and bonding pad 282a is electrically connected to one of more electrical contacting pads 272. Because the bonding pads 280a and 282a are electrically conductive, electrical contact of the functional members on substrate 120 can thus be extended to bonding pad 282a, through which the electrical contact of the functional members in substrate 120 can be further extended to the assigned electrical contacting pads in 272.

The electrically conductive bonding pads 280a and 282a may have any suitable shapes, such as pads, strips, frames, and segments. And these bonding pads can be positioned at any desirable locations on substrates 120 and 122. For example, bonding pad 280a can be positioned outside or even inside the micromirror array area on substrate 120. If bonding pad 280a is positioned within the micromirror area, the corresponding bonding pad 282a will be located inside the area of the addressing electrodes on substrate 122. In an embodiment of the invention, the bonding pad 280a is disposed in a location outside the area of the micromirrors, but is enclosed in an area circumferenced by another bonding material 278. In particular, bonding material 278, that is preferably non-electrical conductive, is provided to bond substrate 120 and 122. Bonding material 136 may or may not be deposited on substrate 120. However, when the two substrates 120 and 122 are bonded together, the electrically conductive bonding pads 280a and 282a are preferably enclosed within the area circumferenced by the bonding material 278.

The electrically non-conductive bonding material 278 may have any desired shapes. Even though it is shown in the figure that the bonding material 278 is deposited along the circumference of substrate 120, and forms a continuous ring with the micromirrors and bonding pad 280a (as well as 282a) enclosed therein, this is not an absolute requirement. Instead, other configurations are also applicable. For example, the bonding material 278 can be segments, frames, and grids deposited on suitable locations of substrate 120 (and/or substrate 122). Alternatively, the bonding material 278 can be formed as pads. If the two substrates 120 and 122 are desired to be hermetically bonded, the bonding material 278 is then desired to be a continuous ring such that when the two substrates 120 and 122 are hermetically bonded together, the functional members (e.g. the mirror plates and addressing electrodes) are fully enclosed within the area circumferenced by the bonding ring 278, as shown in the figure.

In addition to the electrical bonding pads 280a and 282a, other electrical bonding pads, such as 280b and 280b can be provided in the same way as the electrical bonding pads 280a and 280a. According to an embodiment of the invention, electrical bonding pads 280a and 280b can be configured independent from any other electrical bonding pads, including bonding pads 280a and 282a, in many aspects, such as material, geometric shape, and location. The bonding pads 280a 280b, 282a, and 282b can be used to electrically connect any different functional members on substrate 120. For example, bonding pad 280a and 280b can be used to electrically connect the same functional member, such as all reflective deflectable mirror plates of an array of micromirrors formed on substrate 120. Alternatively, bonding pads 280a and 280b can be used to electrically connect different functional members. For example, bonding pad 280a can be used to electrically connect a thin film transparent electrode on substrate 120, while pad 280b can be used to electrically connect all reflective deflectable mirror plates of the micromirrors on substrate 120, as set forth in U.S. patent application "Optical Coating on Light Transmissive Substrates of Micromirror Devices", (now U.S. Pat. No. 7,295,363), the subject matter being incorporated herein by reference in entirety.

The electrical bonding pads 280a, 280b, 282a, and 282b may comprise many suitable materials. In accordance with an embodiment of the invention, the electrical bonding pad comprises an electrical conductive adhesive. Such conductive adhesive is preferably low outgassing, and can be a conductive epoxy. Specifically, the electrically conductive epoxy can be a standard epoxy filled with an electrically conductive material, such as, but not limited to, metal elements (e.g. silver and gold), metalloids, intermetallic materials, or other material such as carbon which by filling the standard epoxy results in a conductive epoxy, or carbides of metal elements, metalloids, intermetallic materials, and ceramics. The conductive adhesive may also comprise an electrically conductive organic (or polymer) material or an electrically non-conductive organic (or polymer) material filled with a conductive material.

The substrate (e.g. substrate 120) having the reflective deflectable mirror plates formed thereon is then bonded to the substrate (e.g. substrate 122) having the addressing electrodes and circuitry formed on using the bonding agent that comprises an electrically conductive bonding material (e.g. electrically conductive bonding pads 280a and 282a), and a electrically non-conductive bonding material such as electrically non-conductive bonding material 278). The bonding process can be performed in many ways according to the specific bonding agent used. As a way of example, the electrical conductive bonding material is an epoxy filled with an electrically conductive material such as gold, silver, and carbon, and the electrically non-conductive bonding material is a regular epoxy. Substrates 120 and 122 are aligned such that the deflectable reflective mirror plates are associated with the addressing electrodes, and the bonding pads (e.g. 280a and 282a) are aligned together. The bonding agent is then cured at selected temperatures so as to achieve desired bonding, such as hermetic bonding. For example, the substrates and the bonding agent are cured at a temperature of from 70° C. to 300° C., or around 140° C. The bonded and hermetically sealed substrates are then cooled down, for example, to a temperature below 100° C., such as 70° C. It is preferred that the bonded substrates are cooled down to a temperature such that the pressure inside the hermetically sealed space between the substrates after cooling (e.g. to the room temperature) is below the atmosphere, such as 500 Torr or lower, or 200 Torr or lower, or 100 Torr or lower. The reduced pressure between the bonded and hermetically sealed substrates is of great importance when the micromirror array device is operated in a typical operation environment of room temperature and at 1 atmosphere. Specifically, the reduced pressure between the substrates can prevent increase of the gap between the substrates due to outwards expansion of the substrates in the presence of temperature variation. For this reason, the pressure inside the hermetically sealed package can be of any pressure below one atmosphere, such as 250 Torr or less, or 50 Torr or less, or 10 Torr or less, or 1 Torr or less, or 100 mTorr or less. The low pressure inside the hermetically sealed package can also be obtained through many other ways, such as sealing the package within a low pressure chamber.

In accordance with an embodiment of the invention, the bonding and sealing of the substrate can be performed in a pressured chamber. During the bonding and sealing, the volume between the two substrates decreases, resulting in increase of pressure between the substrates. This pressure variation may burst the sealing material between the substrates. For this and other reasons, the bonding and sealing of the substrates are performed within a chamber that has a pressure proximate to the internal pressure of the seal gap between the substrates. In this way, the pressure between the substrates during the bonding and sealing is in equilibrium with the environment pressure.

During or right before the bonding, the bonding agent can be cured with UV (or IR) light when the bonding agent comprises UV (or IR) curable epoxy. After such curing, the two substrates are bonded with optional external pressure applied.

The bonding and hermetically sealing the substrates, referred to as assembling, can be performed on wafer level. Specifically, the micromirrors can be formed on a light transmissive wafer having a set of dies each of which comprises an array of micromirrors. The addressing electrodes are formed on a semiconductor wafer having a set of electrode dies each of which comprises an array of addressing electrodes. During assembling, the two wafers are aligned together such that each micromirror is associated with at least one addressing electrode forming a micromirror device. The aligned wafers can then be bonded such that each micromirror die is bonded and sealed with an electrode die. The bonded and sealed dies are subsequently separated to form individual die assembles. This wafer-level assembly process can be adapted to be applicable to other types of micromirror array devices wherein the micromirrors and addressing electrodes are not formed on separate wafers.

The micromirrors can be processed further, such as being packaged for protection, which will not be discussed in detail herein. As another example, electrical contact of the functional members can be accomplished through electrical a contact spring disposed between the two substrates or the substrate and the package substrate as shown in FIG. 17.

Figure 17:
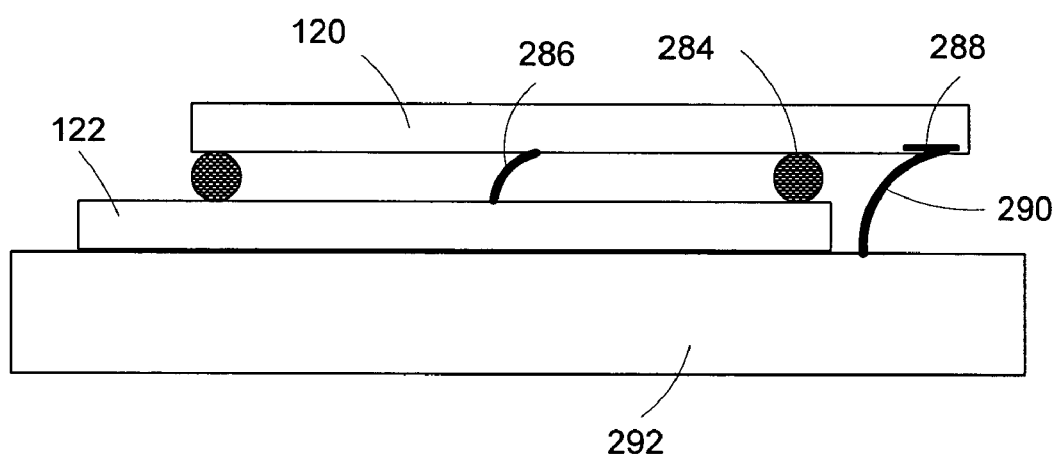
FIG. 17 is a cross-sectional view illustrating substrates bonded through sealing rings.

Referring to FIG. 17, substrates 120 and 122 are bonded through sealing rings (or balls) 284. Such bond may or may not be hermetic. Electrical contact spring 286 is disposed between the two substrates. One end of the contact spring 286 electrically contacts the functional members, such as the electrode on substrate 120 or the mirror plates (if the mirror plates are formed on substrate 120). The other end of the contact spring 286 electrically contacts the lower substrate 122. With this configuration, the electrical contact to the functional members on the upper substrate 120 is extended to the lower substrate 122, which can be further extended to the contact pads (such as the pads 272 in FIG. 15) on the exposed ledge of the lower substrate.

Alternative to the contact spring 286, electrical contact spring 290 can be provided. Different from the contact spring 286, contact spring 290 is disposed outside the enclosure of the two substrates. Instead, contact spring 290 electrically contacts the functional members on the upper substrate 120 to package substrate 292. In this way, the electrical contact on the upper substrate is directly extended from the upper substrate to the package substrate, as set forth in U.S. patent application Ser. No. 10/869,539 filed Jun. 15, 2004 now US publication 2005/0275930), the subject matter being incorporated herein by reference.

When used in a spatial light modulator of a display system as shown in FIG. 1, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

The micromirrors in which embodiments of the invention can be implemented may be composed of any suitable materials and fabricated in many ways. According to the invention, the deflectable mirror plate comprises reflective film, preferably composed of a metallic material (e.g. aluminum, gold, silver) having a high reflectivity, deposited on another non-metallic material, such as $SiO_x$, $SiN_x$ and $TiN_x$ for enhancing the mechanical properties of the mirror plate. Alternatively, other materials, such as a barrier layer for preventing diffusion between the metallic reflecting layer and the mechanical enhancing layer, can be deposited between the metallic reflecting layer and the mechanical enhancing layer.

The deformable hinge preferably comprises an electrically conductive layer. Examples of suitable materials for the hinge layer are Al, Ir, titanium, titanium nitride, titanium oxide(s), titanium carbide, $TiSiN_x$, $TaSiN_x$, or other ternary and higher compounds.

The micromirror array devices can be enclosed in a device package. For example, the micromirror array device can be enclosed with a space between a package substrate and a package cover that is bonded, hermetically or non-hermetically, to the package substrate. Disposed within the space can also be other features, such as getters and lubricants, which will not be described herein in detail.

The micromirrors of the micromirror array device can be operated in many ways, as set forth in U.S. patent applications Ser. No. 09/564,069 filed May 3, 2003 now U.S. Pat. No. 6,388,661), Ser. No. 10/340,162 filed Jan. 10, 2003 (now U.S. Pat. No. 7,012,592, Ser. No. 10/607,687 filed Jun. 23, 2003 (now U.S. Pat. No. 7,274,347), Ser. No. 10/648,689 filed Aug. 25, 2003 (now US publication 2005-0057479), and Ser. No. 10/865,993 filed Jun. 11, 2003 (now US publication 2005-0275643), the subject matter of each being incorporated herein by reference. Alternatively, a technique for increase the visual resolution of a displayed image without having to increase the resolution of a display device to display the desired image and/or with or without increasing the resolution of the image data used to reproduce the desired image can be employed. Specifically, the technique is an optical process that displays a frame of an image at different spatial display locations. For example, the frame is divided into sub-frames, and the sub-frames are displayed at a first spatial display location and at a second spatial display location other than the first spatial display location, as set forth in U.S. patent applications publication number 2004/0028293 filed Aug. 7, 2002 (now U.S. Pat. No. 7,030,894); publication number 2004/0027363 filed Sep. 11, 2002 (now U.S. Pat. No. 7,034,811); publication number 2004/0027313 filed Sep. 11, 2002 (now U.S. Pat. No. 6,963,319); publication number 2004/0025388 filed Jul. 31, 2003; and publication number 2004/0024391 filed Jul. 31, 2003, the subject matter of each being incorporated herein by reference in their entirety.

It will be appreciated by those skilled in the art that a new and useful micromirror array device for use in display systems has been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

We claim:

1. A micromirror array device, comprising:
    first and second substrates bonded together with a gap therebetween;
    an array of mirror plates within the gap;
    an array of addressing electrodes on the second substrate and proximate to the mirror plates for electrostatically deflecting the mirror plates towards the second substrate;
    an electrode on the first substrate for electrostatically deflecting the mirror plates towards the first substrate; and
    wherein a center-to-center distance between the adjacent mirror plates is from 4.38 to 10.17 microns.

2. The device of claim 1, wherein each mirror plate is associated with one single addressing electrode for being addressed and deflected.

3. The device of claim 2, wherein the center-to-center distance between the adjacent mirror plates is from 4.38 to 9.34 microns.

4. The device of claim 2, the array of mirror plates has a diagonal from 0.55 inch to 0.8 inch.

5. The device of claim 4, wherein the array of mirror plates has a diagonal around 0.7 inch.

6. The device of claim 2, wherein the array of mirror plates comprises at least 1280 mirror plates along a length of the array.

7. The device of claim 1, wherein a gap between the adjacent mirror plates is 0.5 micron or less.

8. The device of claim 7, wherein the gap between the adjacent mirror plates is from 0.15 to 0.5 micrometer or less.

9. The device of claim 1, wherein the center-to-center distance between adjacent mirror plates is from 8.07 to 10.16 micrometers.

10. The device of claim 1, wherein the center-to-center distance between adjacent mirror plates is from 6.23 to 9.34 micrometers.

11. The device of claim 1, wherein the first substrate is transmissive to visible light; and wherein the second substrate is a semiconductor substrate.

12. The device of claim 11, wherein the mirror plates are formed on the first substrate; and wherein the addressing electrodes are on the second substrate.

13. The device of claim 12, wherein each mirror plate is attached to a deformable hinge,; and the deformable hinge is held on the first substrate by a post formed on the first substrate.

14. The device of claim 13, wherein the mirror plate is attached to the deformable hinge at an attachment point such that the attachment point is away from the geometric center of the mirror plate.

15. The device of claim 13, wherein the mirror plate is attached to the deformable hinge such that the rotation axis of the mirror plate is parallel to but offset from a diagonal of the mirror plate when viewed from the top as the mirror plate is parallel to the first substrate.

16. The device of claim 1, wherein an addressing electrode of the array of addressing electrodes is extended beyond the furthest edge of the mirror plate when viewed from the lop of the mirror plate as the mirror plate is parallel to the first substrate.

17. The device of claim 1, wherein the electrode on the first substrate is transmissive to the visible light.

18. The device of claim 17, wherein the electrode on the first substrate is in a form of a continuous film, a frame, a grid, a strip, or a pad.

19. The device of claim 17, wherein the first substrate further comprises an anti-reflection optical film.

20. The device of claim 19, wherein the first substrate further comprises a light absorbing or blocking mask.

21. The device of claim 20, wherein the light absorbing or blocking mask is in a form of a frame disposed around the circumference of a major surface of the first substrate.

22. The device of claim 1, wherein the electrode on the first substrate is associated with all micromirrors in the micromirror array.

23. The device of claim 22, wherein the electrode is a multilayered structure that comprises an electrically conductive and electrically non-conductive material.

24. The device of claim 23, wherein the electrically conductive material comprises an indium-tin-oxide.

25. The device of claim 23, wherein the electrically non-conductive material comprises a silicon oxide.

26. The device of claim 25, wherein the electrically non-conductive material further comprises TiOx.

27. The device of claim 25, wherein the electrically non-conductive material further comprises NbOx.

28. The device of claim 1, wherein each mirror plate is associated with a stopping mechanism for limiting a rotation of the mirror plate when the mirror plate is rotated to a desired angle.

29. The device of claim 28, wherein the first substrate is a portion of light transmissive wafer; and wherein the two wafers are bonded together with an intermediate spacer disposed therebetween.

30. The device of claim 1, wherein the second substrate is a portion of a semiconductor wafer having a set of electrode dies formed thereon, wherein each electrode die comprising an array of addressing electrodes.

31. The device of claim 1, wherein the first and second substrates are bonded with a sealing material that comprises a sealing ball.

32. The device of claim 1, wherein the first and second substrates are bonded with a sealing material that comprises an electrically conductive material.

33. The device of claim 32, wherein the electrically conductive material comprises an epoxy that is filled with an electrically conductive element.

34. The device of claim 33, wherein the electrically conductive element is silver.

35. The device of claim 33, wherein the electrically conductive element is gold.

36. The device of claim 33, wherein the electrically conductive element is chromium.

37. The device of claim 32, wherein the electrically conductive material is electrically connected to the electrode on the first substrate.

38. The device of claim 32, wherein the electrically conductive material is electrically connected to the mirror plates.

39. The device of claim 32, wherein the electrode on the first substrate further comprises an insulating layer.

40. The device of claim 1, further comprising: an electrically conductive spring disposed between the first and second substrates, wherein the electrically conductive spring is electrically connected to the electrode on the first substrate.

41. The device of claim 1, further comprising: an electrically conductive spring disposed between the first and second substrates, wherein the electrically conductive spring is electrically connected to the mirror plates.

42. The device of claim 1, wherein the second substrate is disposed on a package substrate.

43. The device of claim 42, wherein the package substrate is bonded to the first substrate.

44. The device of claim 43, wherein the package substrate is bonded to a package cover that is light transmissive.

45. The device of claim 44, wherein the package cover and package substrate are hermetically sealed leaving a space therebetween; and wherein the space has a pressure of 1 atmosphere or less.

46. The device of claim 43, further comprising: a getter disposed.

47. The device of claim 43, further comprising: a lubricant disposed.

48. The device of claim 1, further comprising: a light absorbing mask for absorbing incident light.

49. The device of claim 48, wherein the light absorbing mask is disposed on the first substrate.

50. The device of claim 48, wherein the light absorbing mask is disposed on the second substrate.

51. The device of claim 1, wherein the mirror plates are derived from a single crystal material.

52. The device of claim 51, wherein the single crystal material is a single crystal silicon.

53. The device of claim 1, wherein the mirror plates are formed on the second substrate on which the addressing electrodes are formed.

54. A micromirror array device, comprising:
an array of deflectable reflective mirror plates on a first substrate;
an array of addressing electrodes disposed proximate to and associated with the mirror plates for electrostatically deflecting the mirror plates in a first direction;
a light transparent electrode disposed proximate to the mirror plates for rotating the mirror plates in a second direction other than the first direction; and
wherein a center-to-center distance between the adjacent mirror plates is from 4.38 to 10.17 microns.

55. A projection system, comprising:
an illumination system producing an incident light;
a spatial light modulator comprising a micromirror array device of claim 54 for modulating the incident light;
a projection lens for projecting the modulated incident light onto a display target; and
the display target.

56. The system of claim 55, wherein the illumination system further comprises:
a light source;
a light pipe; and
a color filter comprising a set of color segments.

57. The system of claim 56, wherein the lightpipe is disposed between the light source and the color filter on the propagation path of the illumination light.

58. The system of claim 56, wherein the lightpipe is disposed after both of the light source and the color filter on the propagation path of the illumination light.

59. An assembly, comprising:
first and second wafers;
a plurality of mirror dies each comprising an array of reflective deflectable mirror plates disposed between the first and second wafers;
a plurality of electrode dies on the second wafer with each electrode die comprising an array of addressing electrodes for deflecting the mirror plates towards the second wafer;
a plurality of electrodes disposed on the first wafer for deflecting the mirror plates towards the first wafer; and
wherein a center-to-center distance between adjacent mirror plates in each die is from 4.38 to 10.16 microns.

60. The assembly of claim 59, wherein the mirror dies are on the first wafer that is transmissive to visible light.

61. The assembly of claim 59, wherein the mirror dies are the same as the electrode dies with the addressing electrodes and mirror plates formed on the second substrate.

* * * * *